(12) United States Patent
Cross et al.

(10) Patent No.: US 9,120,430 B2
(45) Date of Patent: Sep. 1, 2015

(54) SYSTEM FOR UTILIZING BRACKET ASSEMBLY

(76) Inventors: William Christopher Cross, Rogersville, AL (US); Steven Darracot, Jr., Rogersville, AL (US)

(*) Notice: Subject to any disclaimer, the term of this patent is extended or adjusted under 35 U.S.C. 154(b) by 155 days.

(21) Appl. No.: 13/413,106

(22) Filed: Mar. 6, 2012

(65) Prior Publication Data
US 2013/0233900 A1   Sep. 12, 2013

(51) Int. Cl.
*B60R 11/00* (2006.01)
*B60R 9/06* (2006.01)
*B60R 13/10* (2006.01)

(52) U.S. Cl.
CPC . *B60R 11/00* (2013.01); *B60R 9/06* (2013.01); *B60R 13/105* (2013.01); *B60R 2011/004* (2013.01); *B60R 2011/008* (2013.01)

(58) Field of Classification Search
CPC ............ B60R 11/00; B60R 2011/004; B60R 2011/008
USPC ......... 224/545, 555, 488, 511, 517, 482, 543, 224/546, 547, 551, 562; 40/591, 592, 40/607.01, 607.11, 607.12; 248/220.21, 248/223.41, 200, 300
See application file for complete search history.

(56) References Cited

U.S. PATENT DOCUMENTS

| | | | | |
|---|---|---|---|---|
| 4,938,399 | A * | 7/1990 | Hull et al. | 224/521 |
| 5,195,264 | A * | 3/1993 | Johanson et al. | 40/591 |
| 6,734,792 | B1 * | 5/2004 | McElveen | 340/468 |
| 7,503,135 | B2 * | 3/2009 | Chafin | 40/591 |
| 2008/0073398 | A1 * | 3/2008 | Plaschka | 224/519 |
| 2009/0201689 | A1 * | 8/2009 | Nolle | 362/485 |

* cited by examiner

*Primary Examiner* — Justin Larson
*Assistant Examiner* — Phillip Schmidt
(74) *Attorney, Agent, or Firm* — Ann I. Dennen; Lanier Ford Shaver & Payne P.C.

(57) ABSTRACT

The present invention is a support and carry system for use with slow moving vehicles having an existing slow moving vehicle support bracket; an extension bar constructed and arranged to be placed in said existing support bracket; an upper support bracket assembly, said upper support bracket dependent on said extension bar, said upper bracket assembly constructed and arranged to receive signage indicating a slow moving vehicle.

9 Claims, 8 Drawing Sheets

Fig. 8

SYSTEM FOR UTILIZING BRACKET ASSEMBLY

BACKGROUND OF THE INVENTION

Field of the Invention

In many States, a slow moving vehicle (SMV) is required to have safety signage such that persons approaching the SMV from the rear are given warning relating to that vehicle's speed in the flow of traffic. Many farm vehicles are required to have SMV signage affixed thereto. The common SMV sign is typically a reflective triangle. Many vehicles, such as farm tractors and farm equipment, have a bracket for an SMV sign affixed thereto at the time of sale. A difficulty has arisen when a user of such SMV desire to use the bracket for a secondary use. While there may be an opportunity to use the existing bracket, the removal of SMV signage presents a problem as most States have laws requiring the display of said signage. There is a need for users of SMV to utilize the existing bracket and comply with local laws regarding display of SMV signage.

SUMMARY OF THE INVENTION

The present invention addresses a need by providing a structure incorporating a secondary bracket whereby an existing bracket normally used for SMV signage is utilized for a dual purpose. The secondary bracket is on an assembly whereby the existing bracket can be utilized to carry other articles and SMV signage is displayed and viewable from persons at the rear of SMV.

In one embodiment the present invention is a support and carry system for use with slow moving vehicles, said system comprising:
- an existing slow moving vehicle support bracket;
- an extension bar constructed and arranged to be placed in said existing support bracket;
- an upper support bracket assembly, said upper support bracket dependent on said extension bar, said upper bracket assembly constructed and arranged to receive signage indicating a slow moving vehicle.

The extension bar has a horizontal support structure connected thereon. The horizontal support is any of a rectangular or circular shelf configured for carrying. The shelf can carry a storage box, water cooler and the like. However, regardless of the article carried, the SMV sign must not be obstructed. The SMV sign must be visible from the rear.

The extension bar includes at least one stabilizing member arranged above a horizontal support structure. There can be a curved stabilizing support to hold a water cooler or can be bracketed to secure a storage box. The stabilizing bar is vertically positioned above the horizontal support structure.

In one embodiment, the extension bar is a fixed length. Alternatively, the extension bar is a vertically adjustable bar, wherein said adjust is vertically upward from said existing support plate.

The system extension bar, in one embodiment, has structure to secure an article into a secure position on a horizontal support structure connected thereon.

DETAILED DESCRIPTION OF THE PREFERRED EMBODIMENT

Figure 1:
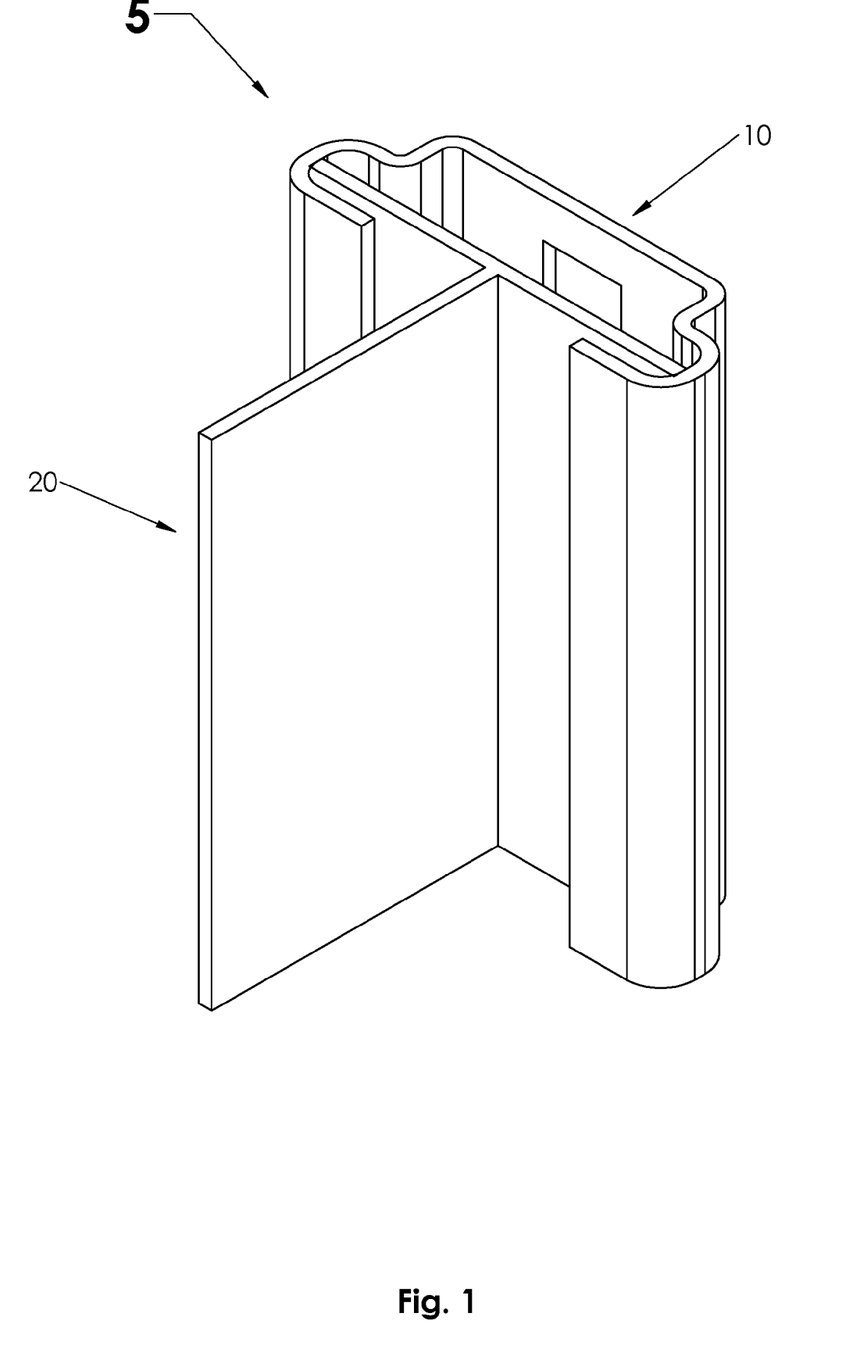
FIG. 1 is a plan view of the assembly of the present invention.
Figure 2:
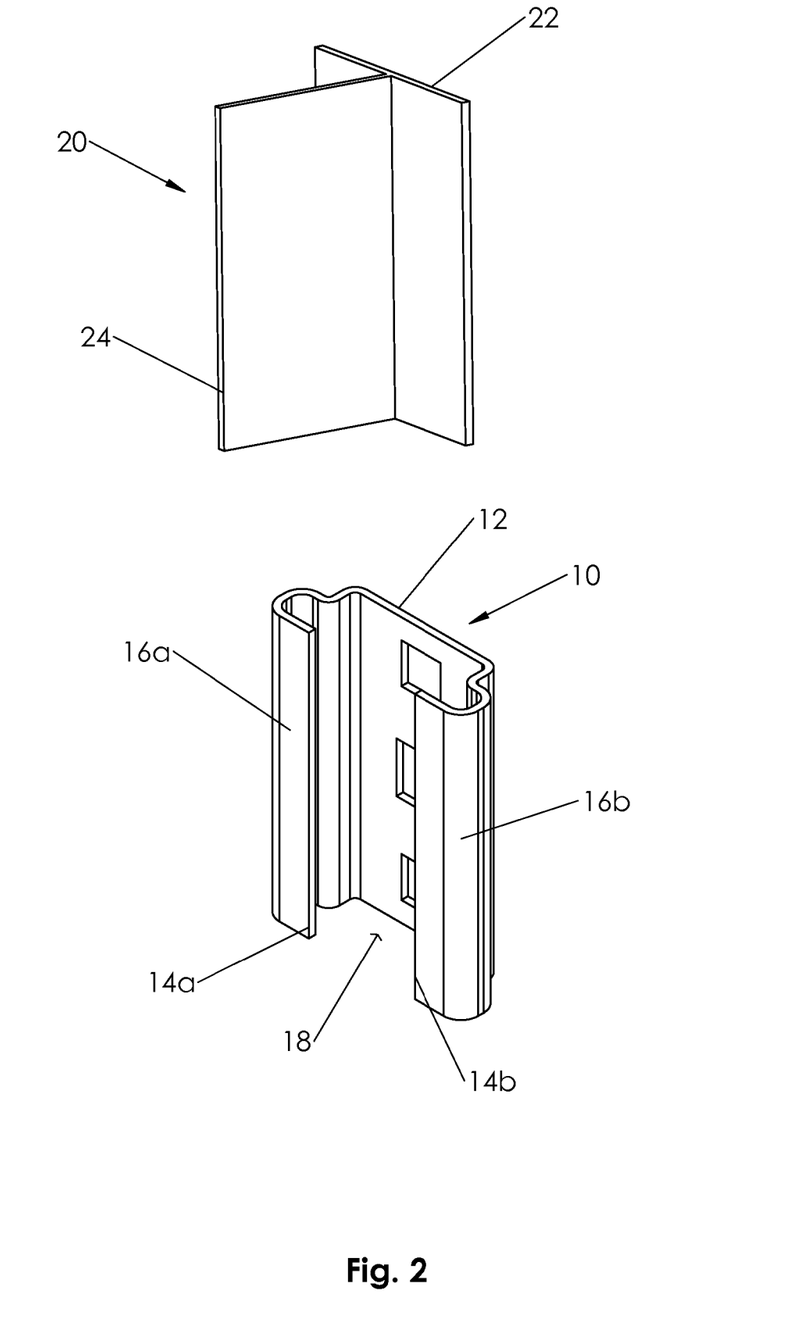
FIG. 2 is a separated plan view of the assembly of the present invention.
Figure 3:
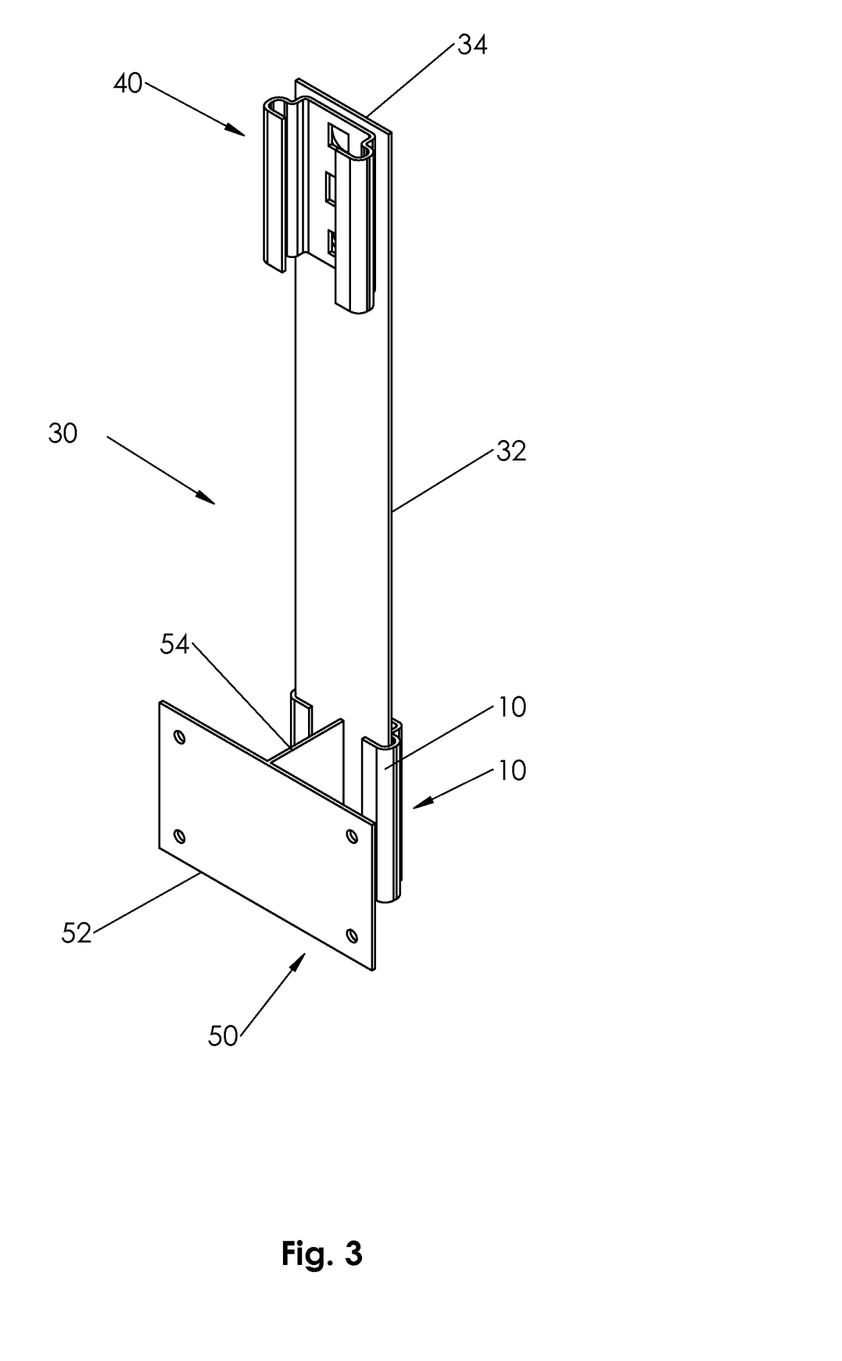
FIG. 3 is an embodiment with an extended bracket holder according to the present invention.
Figure 8:
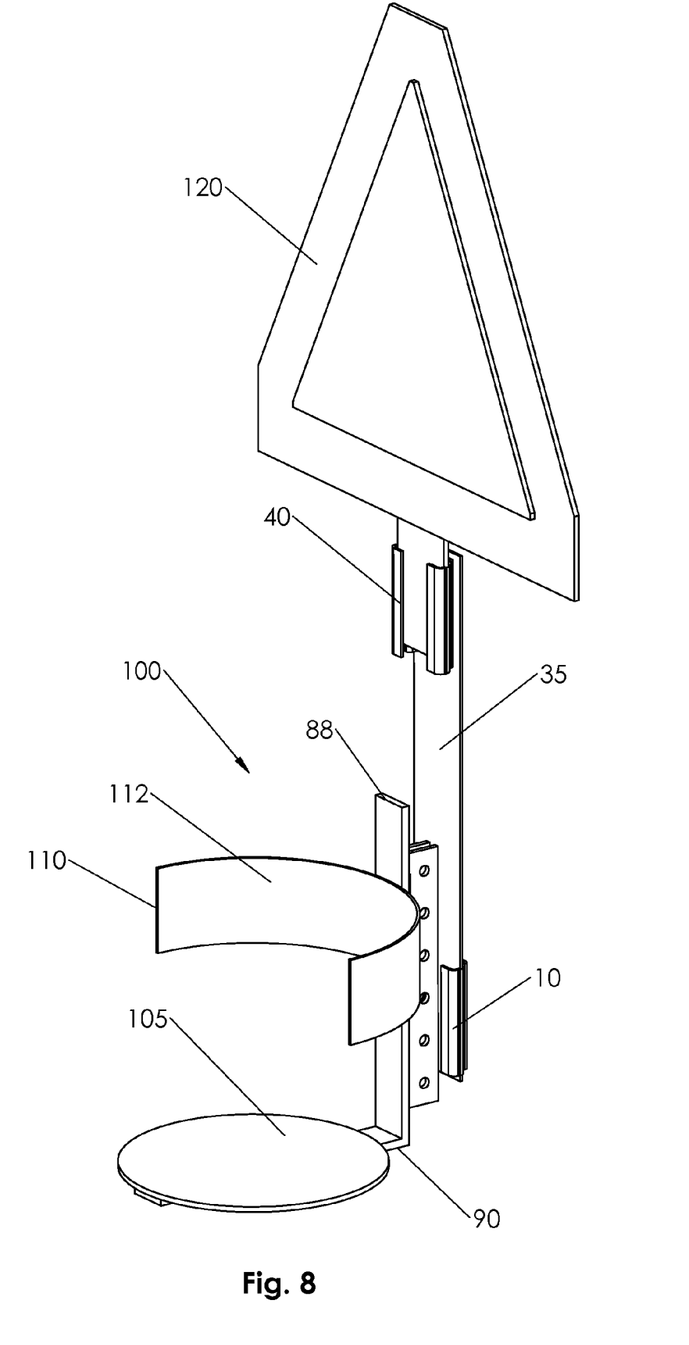
FIG. 8 is a plan view of the assembly of the present invention showing SMV signage on a secondary bracket assembly.

Assembly 5 is a bracket assembly as is known in the art. Bracket assembly generally comprises a main support bracket 10. Said main support bracket 10 is formed of a unitary back plate 12. Said back plate 12 generally being a unitary piece terminating in first curved portion 16a and second curved portion 16b. Said curved portion 16a and 16b defining internal support bracket cavity 18. Said portions 16a and 16b have first terminal end 14a and second terminal end 14b. As is known in the art, main support bracket 10 generally has an internal slanted structure for receiving a removable connecting plate assembly 20. Said connecting plate assembly 20 having a first removable connecting plate 22 and a perpendicular support portion 24. As best seen in FIGS. 1 and 2, bracket assembly 5 is constructed and arranged to receive removable support assembly 20. In one embodiment extension bar 32 is placed within cavity of support plate 18, extension plate 32 has an upper terminal end 34 with upper support bracket assembly 40 affixed thereto. In this particular embodiment a secondary removable connecting plate (not shown) can be inserted into upper support bracket 40 as needed. As best seen in FIG. 8, a slow moving vehicle (SMV) warning sign 120 is affixed to the upper or secondary bracket 40 and is visible from persons behind a vehicle utilizing the present invention. In general use, a secondary bracket such as upper support bracket 40 is used in order to affix safety signage relating to operation to a slow moving vehicle.

Figure 4:
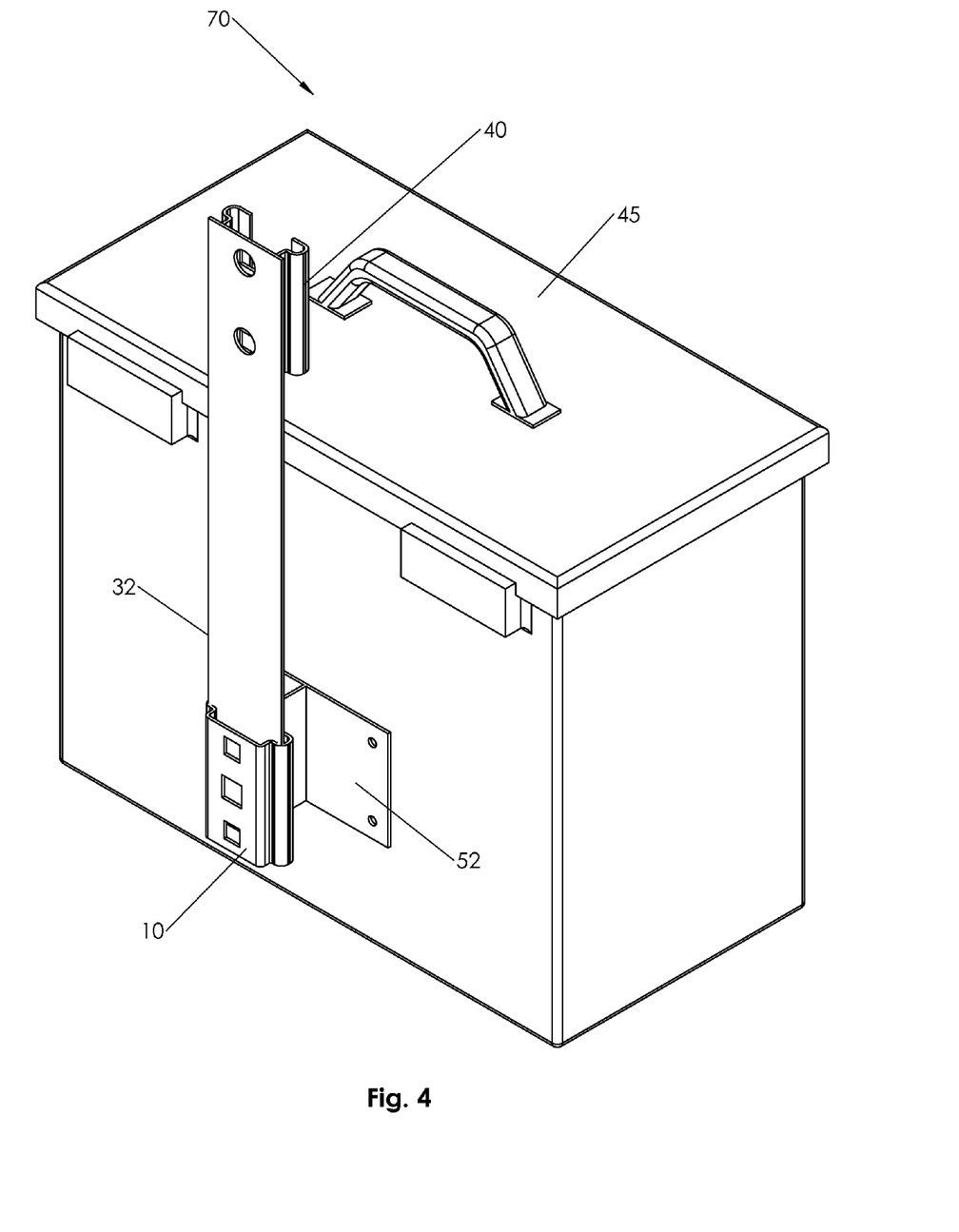
FIG. 4 is an embodiment whereby a toolbox is incorporated for use in the present invention.
Figure 5:
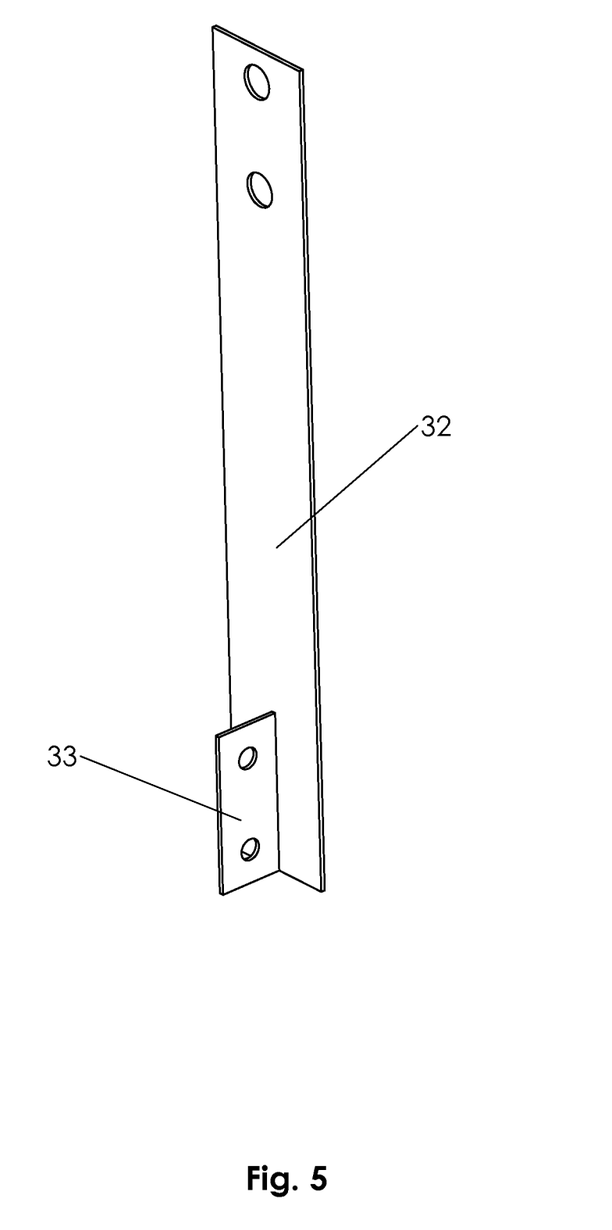
FIG. 5 is a plan view of the extended bracket of the present invention.
Figure 6:
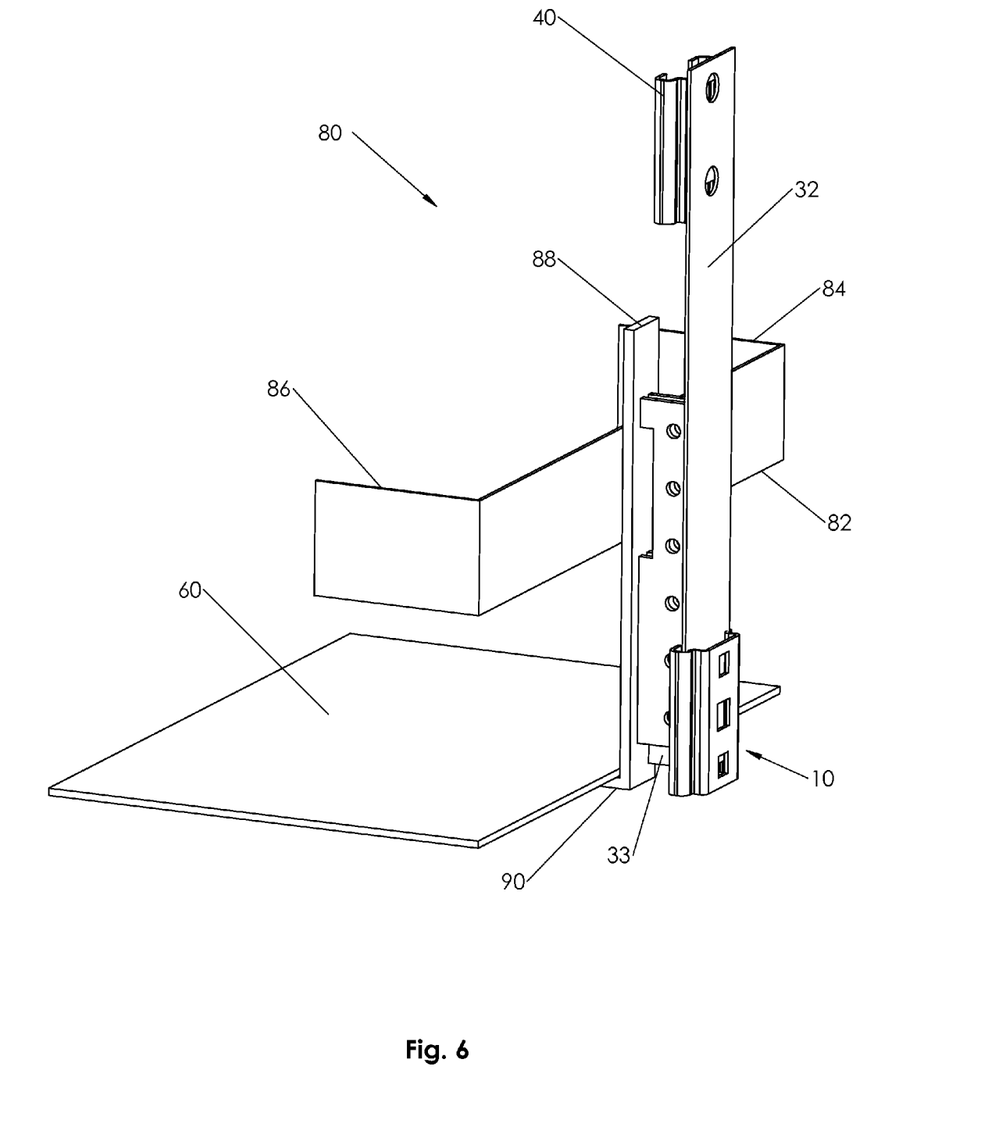
FIG. 6 is an embodiment whereby a support plate is incorporated for use in the bracket assembly of the present invention.
Figure 7:
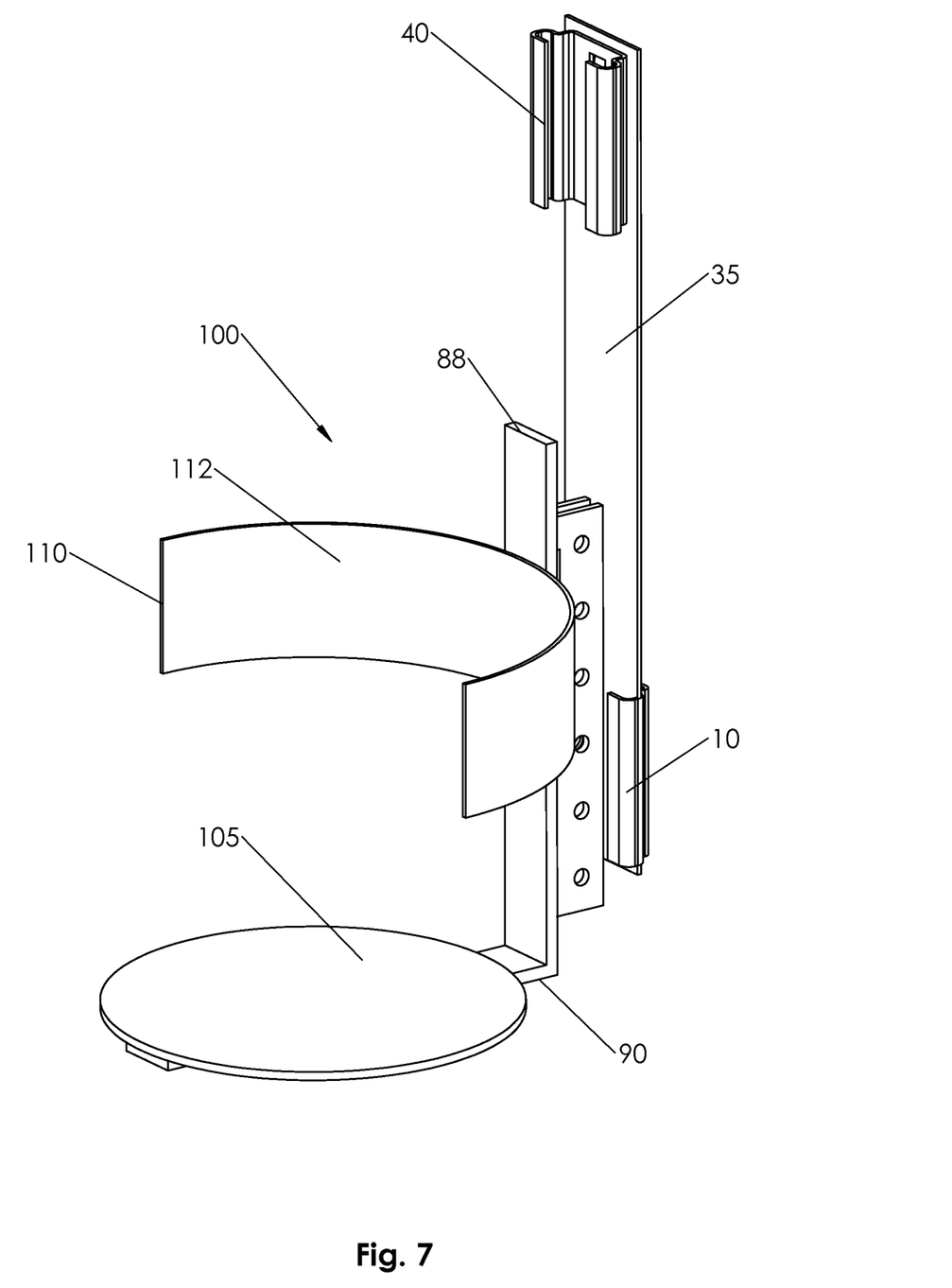
FIG. 7 is a further embodiment whereby a round support plate is incorporated for use in the system of the present invention.

In use, a typical slow moving vehicle has support bracket 10 in which a safety sign is typically affixed. In order to utilize bracket 10 for additional uses as set forth herein, it becomes necessary to provide a secondary bracket such as upper support bracket 40 in which a safety sign may be supported thereon. The SMV sign 120 is removed from bracket 10 and a secondary structure is inserted thereto. Examples of secondary structure embodied in FIGS. 3, 4, 6 and 7. The secondary structure may be constructed and arranged for a variety of particular uses. Uses may include, but would not be limited to support of a storage box as in FIG. 4. A shelf support in which a variety of articles may be rested thereon as in FIG. 6 or a circular support as in FIG. 7 that supports a typical water cooler (not shown). Regardless of the secondary structure, it is important that at least one secondary bracket, such as upper support bracket assembly 40 is accessible and provides an unobstructed line of sight to a safety sign affixed thereon. As best seen in FIG. 4 a secondary bracket 40 is visible above a storage box 45 in storage box arrangement 70. In this particular embodiment, a support plate 52 is constructed and arranged to sit flush against storage box 45.

Structure 52 may further encompass fastening means such as screws or ribbons (not shown) such that storage box 45 is secured thereto. In the embodiment shown in FIG. 6, assembly 80 encompasses the upper support bracket assembly 40 and further has a support structure 82 affixed to support bar 88. Said support bar 82 further encompasses a first support end 84 and a second support end 86. Support bar 82, being placed above support plate 60. Plate support 90 is constructed and arranged to support plate 60. In this particular arrangement, articles may be stored on support plate 60 and slow moving vehicle signage is affixed on upper support bracket assembly 40.

The general configurations may change, but the invention should provide for a secondary bracket assembly to be attached to the SMV bracket of a vehicle such that the conventional SMV bracket is used as a holder and SMV signage is displayed on the secondary bracket, as is shown in FIG. 8 but understood to be part of the various embodiments of the invention.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

We claim:

1. A warning sign mounting bracket assembly for a slow moving vehicle, said bracket comprising:
    an elongated vertical member having a planar outward surface and an upper end and a lower end;
    upper and lower mounting brackets disposed at said upper and lower ends, respectively, said lower mounting bracket defining a channel dimensioned to receive said lower end of said elongated vertical member and said upper mounting bracket configured to receive a warning sign post; and
    a vertically oriented support rib extending perpendicularly from said outward surface disposed near said lower end; and
    a flange supporting one or more article securement structures, said flange overlaying said support rib and having a planar outward surface.

2. The mounting bracket assembly of claim 1, further comprising a generally "c-shaped" article securement structure attached to said flange and having arms extending horizontally and outwardly away from said flange.

3. The mounting bracket assembly of claim 1, wherein said flange is vertically oriented with a lower end and said one or more article securement structures comprises a horizontal platform extending from said lower end of said flange.

4. The mounting bracket assembly of claim 3, further comprising a generally "c-shaped" article securement structure attached to said flange and having arms extending horizontally and outwardly away from said flange.

5. The mounting bracket assembly of claim 3, wherein said horizontal platform is one of a round platform and a square platform.

6. The mounting bracket assembly of claim 1, wherein said lower mounting bracket enables attachment of said assembly to the rear of a slow moving vehicle.

7. The mounting bracket assembly of claim 6, wherein said flange is vertically oriented with a lower end and said one or more article securement structures comprises a horizontal platform extending from said lower end of said flange and a generally "c-shaped" article securement structure attached to said flange and having arms extending horizontally and outwardly away from said flange.

8. The mounting bracket assembly of claim 1, wherein said flange is attached to a wall of a container.

9. The mounting bracket assembly of claim 8, wherein said lower mounting bracket enables attachment of said assembly to the rear of a slow moving vehicle.

* * * * *